United States Patent
Millerd et al.

(10) Patent No.: US 11,262,191 B1
(45) Date of Patent: Mar. 1, 2022

(54) ON-AXIS DYNAMIC INTERFEROMETER AND OPTICAL IMAGING SYSTEMS EMPLOYING THE SAME

(71) Applicant: Onto Innovation Inc., Wilmington, MA (US)

(72) Inventors: James Millerd, Tucson, AZ (US); Eric Frey, Tucson, AZ (US)

(73) Assignee: Onto Innovation Inc., Wilmington, MA (US)

( * ) Notice: Subject to any disclaimer, the term of this patent is extended or adjusted under 35 U.S.C. 154(b) by 0 days.

(21) Appl. No.: 16/509,162

(22) Filed: Jul. 11, 2019

Related U.S. Application Data (60) Provisional application No. 62/696,936, filed on Jul. 12, 2018.

(51) Int. Cl.
*G01B 11/24* (2006.01)
(52) U.S. Cl.
CPC .................. *G01B 11/2441* (2013.01)
(58) Field of Classification Search
CPC ............ G01B 9/02091; G01B 11/2441; G01B 9/0209; G01B 2290/70; G01B 9/02027; G01B 9/02007; G01B 9/02; G01B 11/06; G01B 11/0675; G01B 9/02028; G01B 9/02057; G01B 11/161; G01B 9/02072; G01B 2290/25; G01B 11/005; G01B 11/02; G01B 11/25; G01B 11/272; G01B 2290/60; G01B 9/04; G01B 9/02097; G01B 9/02025; G01B 9/02098; G01B 11/30; G01B 9/02047; G01B 9/02061; G01B 9/021; G01B 11/27; G01B 9/02018; G01B 9/02065; G01B 11/168; G01B 11/2527; G01B 111/306; G01B 11/03; G01B 11/0616; G01B 11/0666; G01B 11/162; G01B 11/2522; G01B 11/2536; G01B 2290/10; G01B 11/0641; G01B 11/164; G01B 1/2545; G01N 21/45; G01J 3/45; G01J 3/2823; G01J 3/0224; G01J 9/02
See application file for complete search history.

(56) References Cited

U.S. PATENT DOCUMENTS

| | | | |
|---|---|---|---|
| 4,575,248 A | 3/1986 | Horwitz | |
| 4,606,638 A | 8/1986 | Sommargren | |
| 4,643,575 A | 2/1987 | Hazeltine et al. | |
| 4,872,755 A * | 10/1989 | Kuchel | G01J 9/02 356/495 |
| 4,955,719 A | 9/1990 | Hayes | |
| 5,166,751 A * | 11/1992 | Massig | G01B 9/02081 356/495 |

(Continued)

OTHER PUBLICATIONS

De Groot, "A new class of wide-field objectives for 3D interference microscopy," SPIE Optical Metrology, Jun. 22-25, 2015, Munich, Germany.

(Continued)

*Primary Examiner* — Mohamed K Amara
(74) *Attorney, Agent, or Firm* — Paradice and Li LLP (57) ABSTRACT

An optical device for characterizing a workpiece combines an interferometer with a polarization rotation pellicle, installed in a stand-alone fashion in a spatial gap between the mirrors of the interferometer, and a polarization based phase-shift sensor.

24 Claims, 8 Drawing Sheets

(56) References Cited

U.S. PATENT DOCUMENTS

| | | | | |
|---|---|---|---|---|
| 5,469,259 A * | 11/1995 | Golby | G01B 9/02019 | 356/495 |
| 5,488,477 A * | 1/1996 | de Groot | G01B 9/02057 | 356/514 |
| 5,589,938 A | 12/1996 | Deck | | |
| 5,663,793 A | 9/1997 | de Groot | | |
| 5,777,741 A | 7/1998 | Deck | | |
| 5,883,717 A | 3/1999 | DiMarzio et al. | | |
| 5,953,124 A * | 9/1999 | Deck | G01B 9/04 | 356/497 |
| 6,122,058 A * | 9/2000 | Van Der Werf | G01B 9/02027 | 356/635 |
| 6,304,330 B1 | 10/2001 | Millerd et al. | | |
| 6,552,808 B2 | 4/2003 | Millerd et al. | | |
| 6,717,680 B1 * | 4/2004 | Kuchel | G01B 11/2441 | 356/514 |
| 6,744,522 B2 * | 6/2004 | De Groot | G01B 11/02 | 356/503 |
| 6,847,457 B2 | 1/2005 | Tobiason et al. | | |
| 6,850,329 B2 | 2/2005 | Tobiason et al. | | |
| 6,856,405 B2 * | 2/2005 | Tang | G01B 11/2441 | 356/512 |
| 6,882,432 B2 * | 4/2005 | Deck | G01B 9/02028 | 356/512 |
| 6,992,779 B2 * | 1/2006 | Ueki | G01B 9/02004 | 356/497 |
| 7,002,694 B2 * | 2/2006 | Schulte | G01B 11/2441 | 356/512 |
| 7,057,738 B2 | 6/2006 | Millerd et al. | | |
| 7,230,717 B2 | 6/2007 | Brock et al. | | |
| 7,388,675 B2 * | 6/2008 | Indars | G01B 11/2441 | 356/514 |
| 7,417,743 B2 * | 8/2008 | De Groot | G01B 11/2441 | 356/503 |
| 7,423,766 B1 * | 9/2008 | Li | G01B 11/2441 | 356/521 |
| 7,492,469 B2 * | 2/2009 | De Groot | G01B 11/2441 | 356/512 |
| 7,612,889 B2 * | 11/2009 | Nakata | G03F 7/70775 | 356/493 |
| 7,675,628 B2 * | 3/2010 | Millerd | G01B 9/0209 | 356/492 |
| 7,738,117 B2 * | 6/2010 | Altenberger | G01B 9/02065 | 356/511 |
| 7,777,895 B2 * | 8/2010 | Medower | G01B 11/25 | 356/521 |
| 7,821,648 B2 * | 10/2010 | Yamazoe | G01B 11/255 | 356/515 |
| 7,889,355 B2 * | 2/2011 | De Lega | G01B 9/02087 | 356/511 |
| 7,978,338 B2 * | 7/2011 | De Groot | G01B 11/2441 | 356/497 |
| 8,045,175 B2 * | 10/2011 | De Groot | G01B 9/02058 | 356/497 |
| 8,072,610 B1 | 12/2011 | Schmit et al. | | |
| 8,345,258 B2 * | 1/2013 | Millerd | G01B 9/02045 | 356/492 |
| 8,351,048 B2 * | 1/2013 | Millerd | G01B 9/0209 | 356/491 |
| 9,377,559 B2 * | 6/2016 | Cooper | G01H 9/004 | |
| 10,782,122 B2 * | 9/2020 | Ishigaki | G01B 11/02 | |
| 2002/0145739 A1 * | 10/2002 | De Groot | G01B 11/06 | 356/503 |
| 2003/0174339 A1 * | 9/2003 | Feldchtein | G01B 9/02091 | 356/479 |
| 2005/0046864 A1 * | 3/2005 | Millerd | G01B 9/02091 | 356/495 |
| 2006/0066874 A1 * | 3/2006 | Ueki | G01B 9/02057 | 356/512 |
| 2006/0139656 A1 * | 6/2006 | Kulawiec | G01B 9/02027 | 356/512 |
| 2006/0158659 A1 * | 7/2006 | Colonna De Lega | G01B 9/0209 | 356/497 |
| 2007/0019203 A1 * | 1/2007 | Jansen | G01B 9/02059 | 356/495 |
| 2007/0133004 A1 * | 6/2007 | Duplain | G01K 11/32 | 356/491 |
| 2007/0211256 A1 * | 9/2007 | Medower | G01B 9/0201 | 356/491 |
| 2008/0117436 A1 * | 5/2008 | Altenberger | G01B 9/0209 | 356/521 |
| 2010/0309476 A1 * | 12/2010 | Millerd | G01B 9/02079 | 356/495 |
| 2011/0007323 A1 * | 1/2011 | De Groot | G01B 9/02057 | 356/519 |
| 2011/0075151 A1 * | 3/2011 | Jeong | G01N 21/956 | 356/453 |
| 2014/0078298 A1 * | 3/2014 | Kudenov | G01J 3/0208 | 348/135 |
| 2014/0376002 A1 * | 12/2014 | Meissner | G01B 9/02027 | 356/491 |
| 2015/0115934 A1 * | 4/2015 | Mueller | G01R 15/247 | 324/96 |
| 2015/0355027 A1 * | 12/2015 | Beghuin | G01J 3/2823 | 356/453 |
| 2021/0196120 A1 * | 7/2021 | Puyo | A61B 3/0025 | |

OTHER PUBLICATIONS

Guideline No. GT-TE-2404, NASA Technical Memorandum 4322A, NASA Reliability Preferred Practices for Design and Test, NASA Office of Safety and Mission Assurance, Washington, 1999.

Koliopoulos, "Simultaneous phase-shift interferometer," Proc. SPIE 1531, 119-127 (1992).

Abdelsalam, "Single-shot parallel four-step phase shifting using on-axis Fizeau interferometry," Applied Optics, vol. 15 No. 20, 2012.

Smythe, ("Instantaneous Phase Measuring Interferometry", Proc. SPIE 0429, Precision Surface Metrology, Nov. 15, 1983.

* cited by examiner

| Transmission Sphere F/# | Max Pellicle Thickness |
|---|---|
| 0.75 | 10 microns |
| 1 | 25 microns |
| 1.5 | 125 microns |
| 3.5 | 3750 microns |

ON-AXIS DYNAMIC INTERFEROMETER AND OPTICAL IMAGING SYSTEMS EMPLOYING THE SAME

CROSS-REFERENCE TO RELATED APPLICATIONS

This application claims the priority of the U.S. Provisional Application Ser. No. 62/696,936 filed on Jul. 12, 2018, the disclosure of which is incorporated by reference herein.

BACKGROUND OF THE INVENTION

Field of the Invention

The invention relates in general to interferometers and their use for optical testing, and, in particular, to Fizeau interferometers.

Description of the Related Art

Phase-shift interferometry is an established method for measuring a variety of physical parameters that range from the shape of optical components to the density of gas in aerodynamic flow fields. An interferometric wavefront sensor, which employs phase-shift interferometry, typically includes a temporally-coherent light source (such as a laser, for example), the light output from which is spatially split two form and define two optical wavefronts (a reference optical wavefront and a test or object optical wavefront), propagating along different optical paths and later recombined after traversing different path lengths. Upon the recombination, the relative phase difference between these two wavefronts manifests as a two-dimensional intensity pattern known as an interferogram. Phase-shift interferometers typically have an element in the path of the reference wavefront that is configured to introduce multiple (usually three or more) known phase-steps or phase-shifts into the reference wavefront. By detecting, with a detector, the intensity patterns corresponding to each of such phase-shifts, the phase distribution of the object wavefront can be quantitatively and rapidly calculated independently from the irradiance in the reference wavefront or the object wavefront.

Phase-shifting of the appropriate wavefront (and, accordingly, the resulting images) can either be accomplished by sequentially introducing a phase-step (temporal phase-shifting) into such a wavefront, by splitting the optical beam corresponding to the wavefront into parallel channels or beams for simultaneous phase-steps (parallel phase-shifting) of each, or by introducing a high-frequency spatial onto the beam (spatial phase-shifting). The use of parallel and spatial phase-shifting modalities achieve data acquisition in time intervals that are several orders of magnitude shorter than times required by the temporal phase-shifting process, and thus provide significant vibration immunity to the measurement process. Several methods of parallel phase-shifting have been disclosed in the related art. Smythe and Moore ("Instantaneous Phase Measuring Interferometry", Proc. SPIE 0429, Precision Surface Metrology, 15 Nov. 1983; available at doi.org/10.1117/12.936335) and Koliopoulos ("Simultaneous phase-shift interferometer," Proc. SPIE 1531, 119-127 (1992) describe a parallel phase-shifting method where a series of conventional beam splitters and polarization optics are used to produce three or four phase-shifted images onto as many cameras for simultaneous detection. A number of U.S. Patents (such as, for example, U.S. Pat. Nos. 4,575,248, 5,589,938, 5,663,793, 5,777,741, 5,883,717) disclose variations of this method where multiple cameras are used to detect multiple interferograms. Several related-art publications and U.S. Pat. Nos. 6,304,330 and 6,552,808 described methods to simultaneously image three or more interferograms onto a single sensor.

Tobiason et. al. (U.S. Pat. Nos. 6,850,329 and 6,847,457) and Brock et al. (U.S. Pat. No. 7,230,717) outlined spatial phase-shifting methods where a high-frequency spatial pattern is encoded on the beam to effect simultaneous measurement without any significant division of the reference and test beams. These methods substantially rely on utilizing reference and test beams that are orthogonally-polarized and have the advantage of being true common-path systems. Distortions caused by specific optical components (such as zoom modules or beamsplitters, for example) do not affect the measurement accuracy.

Interferometers that have the test and reference surfaces located along and on the same optical axis (commonly known as Fizeau interferometers) offer operational advantages over other types of interferometers because the Fizeau interferometers can be configured to contain no elements or components between the test and reference surfaces (that is, no intra-cavity elements). A Fizeau interferometer, in practice, only requires one precision surface (the reference surface), which leads to greatly reduced manufacturing costs. Integrating and employing a Fizeau interferometer with parallel or spatial phase-shifting techniques has proven somewhat difficult, however, due to the need to encode opposite polarizations from reflections of light occurring off of nominally-common optical path components and due to a preference not to alter the surfaces or to introduce an intra-cavity element. Sommargren (U.S. Pat. No. 4,606,638) taught a method for absolute distance measurement that employs a Fizeau-type interferometer and uses a thin-film polarization reflection coating of an optical surface to separate the object (test) and reference beams of light. The employment of the thin-film coating requires the incident and reflected wavefronts to be at a significant spatial angle (that is, to be inclined) with respect to one another and only works over a narrow spectral band (a narrow range of wavelengths of light). These limitations significantly restrict the spatial range at which the test optic can be placed, requiring the test and reference elements to be nearly in contact with one another to avoid spatial separation between the test and reference optical wavefronts. In addition, the Sommargen solution requires alteration of the cavity surface (s).

Millerd et al. (U.S. Pat. No. 7,057,738) described a Fizeau interferometer based system that integrates a parallel phase-shifting sensor with a Fizeau interferometer. Tilt is used in the Fizeau interferometer cavity to either spatially separate the orthogonal polarization components for filtering on the receiving end, or to recombine portions of light that have orthogonal polarization states and that have been launched at different angles into the Fizeau cavity. Introducing tilt in the Fizeau cavity in order to separate or combine the two polarization components of light has several undesirable consequences. First, the separate paths taken by light beams at the two polarizations can introduce aberrations into the measurement of the surfaced of the workpiece under test, particularly when using spherical reference optics. Second, it is necessary to spatially filter the light beams at the imaging end of the overall system to block light having unwanted polarizations. This inevitably reduces the number of tilt fringes that can be measured at the phase-shifting sensor as well as the quality of the image itself.

In U.S. Pat. No. 4,872,755, Kuchel et al. proposed a method to provide orthogonally polarized reference and test beams in a Fizeau cavity without using tilt. By introducing an optical delay device in the measurement portion of the interferometer and judiciously selecting the coherence length of the light, the length of the delay path, and the length of the gap in the Fizeau cavity, two coherent test and reference beams as well as two incoherent beams are produced simultaneously. The delay device is used to vary the optical path difference between the two orthogonally-polarized beams to ensure that they are still coherent with each other after the delay in the Fizeau cavity. Thus, the approach of Kuchel et al. requires fine adjustment of the length of the delay path, which is expensive and time consuming to implement. U.S. Pat. No. 6,717,680 to Kuchel also discloses an invention for eliminating stray reflections within an interferometer by modulating the Fizeau cavity with two external phase-shifters.

Brock et al. (U.S. Pat. No. 7,230,717) described a spatial phase-shifting sensor integrated with a Fizeau interferometer using either a tilted beam arrangement with a long coherence-length light (which requires calibration off-axis errors especially for spherical reference optics) or an on-axis arrangement with a short coherence-length light (that requires path-matching for each and every test configuration). Here, a polarization frequency shifting element is synchronously actuated with displacement of the reference optic to selectively interfere orthogonally polarized beams from the reference and test optics, respectively. This technique does not require any specially coated reference optics but does require rapid translation and precise synchronization.

Millerd (U.S. Pat. No. 8,351,048) described a spatial phase-shifting sensor integrated with a Fizeau interferometer using a thin-film wire-grid polarizer deposited on (affixed to) the reference surface of the transmission optic. This solution is disadvantageous in that the application of the wire-grid polarizer to spherical reference surfaces and maintaining the high surface accuracy is simply difficult to implement in practice, thereby reducing the usefulness of the solution to those utilizing the planar reference optical surfaces.

Hayes (U.S. Pat. No. 4,955,719) showed that a thin absorbing pellicle could be used in a Fizeau cavity in order to provide attenuation of a strong return from a highly reflective beam returning measured optics and avoid multi-bounce artifacts in the measurement. These commercially available devices have very good quality transmitted wavefronts and are very thin, typically less than 10 microns, so that they may be placed in a converging beam without generating significant optical aberrations.

Hazeltine et al. (U.S. Pat. No. 4,643,575) described the use of quarter waveplates in Fizeau cavities to adjust the relative amplitude of the returned beams to optimize heterodyne performance. Abdelsalam et al. ("Single-shot parallel four-step phase shifting using on-axis Fizeau interferometry", Applied Optics, vol. 15 no. 20, 2012) demonstrated that a waveplate could be used as the reference optic in a Fizeau interferometer in combination with polarization-based sensors to provide the requisite polarization difference between the reference and test beams. A person of skill in the art, however, readily understands that neither of these two solutions works in a strongly converging light beam.

While the combination of the spatial phase-shift sensor with either the tilted-beam Fizeau, delay-line Fizeau, synchronously phase-shifting element Fizeau, or thin-film polarization coated refence optic Fizeau significantly extends the capability of each instrument, it does not overcome the inherent disadvantages of each. Therefore, there is still a need for a phase measurement system based on a Fizeau interferometer that does not suffer from the shortcomings of the previous inventions.

SUMMARY

Embodiments of the current invention provide an interferometer with a cavity configured to carry out quantitative measurements of the object (or workpiece under test)—specifically, a spatial profile of the surface of the object or opto-geometrical parameters of the object affecting the optical wavefront upon the transmission of the wavefront through the object—not only in a single shot (that is, in one camera frame integration time) but also without the need for any of a) tilt or inclination between the beams propagating within the cavity, b) application of thin films to (coating of) the reference surface, c) the use of short coherence length sources of light, and d) spatial translation or repositioning of the reference optic, in contradistinction with related art. Here, input beam of light from a laser source having a coherence length equal to or longer than the cavity under test and a predefined input polarization state is launched into a standard interferometer cavity. In a specific case, such cavity is a cavity of a Fizeau interferometer, and it is formed by a reference surface, which is a surface of the reference optic, and a test surface, which is a surface of the workpiece under test. A standard reference optic (typically a transmission flat or sphere as known in the art) is used to reflect a portion of the beam of light to form a reflected beam having a state of polarization that depends on the input polarization. A test beam of light is generated as a result of transmitting a portion of the input beam through the reference surface, transmitting this portion through an optical retarder (which in one specific case may be constructed with the use of a polarization rotation film), reflecting the so-transmitted light from a return reflector and transmitting it again through the optical retarder. Notably, the optical retarder component (interchangeably referred sometimes to as an optical pellicle) employed in the system of the invention possesses an uncharacteristically-small for related art optical thickness—on the order of several tens of microns or less—to operate in such regime when optical aberrations introduced by the retarder to the wavefront of light propagating through it are practically insignificant for the purposes of the interferometric measurement (in one example—smaller than a quarter of a wave, preferably smaller than $1/10$ of a wave, most preferably smaller than $1/20$ of a wave) and do not require any additional compensation. Such regime, as a person of skill will readily appreciate, has not been achieved in related art thus far.

The optical retarder is designed such that light that has passed though the film, reflected from a sample/workpiece, and passed back thorough the retarder has a state of polarization that is substantially orthogonal to the state of polarization of light that has reflected from the reference surface but has not passed through the optical retarder. The reference and test beams are then spatially recombined to be substantially spatially overlapped and substantially collinear in propagation. The combination of the so-recombined test and reference beams is then delivered to and imaged onto a polarization phase-shifting sensor. (Polarization shift-sensor has been discussed in U.S. Pat. No. 7,057,738, the entire disclosure of which is incorporated by reference.) Thus, the system functions as a single shot, polarization phase-shift interferometer. Both the reference and test beams remain on axis of the interferometer, while the precise path-matching within the interferometer and/or precise translation of the reference optic is not required, in contradistinction with related art. In related implementations, the workpiece under test may be configured as an optically-transmissive element disposed between a mirror of the interferometer at hand and the optical retarder element (whether such mirror is a pre-calibrated planar reflector or a pre-calibrated spatially-curved reflector).

Accordingly, embodiments of the invention provide a method for optical testing a surface of a workpiece, the method including the steps of a) partially reflecting light from an input beam of light, having an axis, at a reference surface of an interferometer to form a reference beam of light having a first state of polarization and partially transmitting the input beam through the reference surface to form a first beam of light; b) transmitting the first beam of light, that has propagated twice through both an optical retarder and a first space separating the optical retarder from the reference surface, through the reference surface to form a test beam of light having a second state of polarization; and c) projecting the reference and test beams of light at a combination of a polarization phase-shift sensor and an optical detector to form a plurality of optical interference fringes representing the surface. Here, the first and second states of polarization are substantially orthogonal to one another. In a specific embodiment, at least one of the following conditions is satisfied: i) the step of partially reflecting light to form the reference beam of light includes partially reflecting light away from the optical retarder; ii) the step of transmitting the first beam of light includes transmitting the first beam of light through a surface of the optical retarder that is inclined with respect to the axis; and iii) an additional step is taken of substantially focusing the first beam of light that has passed through the first space and the optical retarder before impinging light from the first beam of light onto a test surface of the Fizeau interferometer.

Alternatively or in addition, the embodiment of the method satisfies at least one of the following conditions: 1) the process of transmitting the first beam of light includes transmitting the first beam of light twice through said optical retarder that is reversibly repositionable within a cavity of the Fizeau interferometer; 2) the process of transmitting the first beam of light includes transmitting the first beam of light twice through a second space separating said optical retarder from the test surface; and 3) the method additionally includes the step of propagating the reference beam and the test beam along the axis, where the axis is substantially perpendicular to the reference surface.

Embodiments of the invention additionally provide an optical system that has an axis and that is configured to measure a test surface in input light propagating along the axis. Such system includes a reference optical surface positioned substantially normal to the axis; an optical detection system including a polarization phase-shift sensor and an optical detector separated from the reference surface by the polarization phase-shift sensor; and an optical retarder repositionably disposed across the axis to be inclined with respect to the axis and separated from the optical detector by the reference surface and from the reference surface by a first non-zero separation distance. In one implementation, the optical system additionally includes an optical polarizer; an optical beam splitter; a light source configured to deliver said input light along the axis through the optical polarizer and through the optical beam-splitter to the reference surface; and the test surface disposed across the axis at a second separation distance from the optical retarder. In such a specific case the optical system is configured as a Fizeau interferometer in which a portion of the input light, that has traversed twice both the first separation distance and the optical retarder, forms a test beam and in which a portion of the input light that has reflected from the reference surface forms the reference beam.

Embodiments of the invention additionally provide for an interference optical objective containing an optical retarder disposed such that, when said optical objective is used to image an object, the optical retarder is inside a first arm of an interferometer that contains said object, wherein a second arm of the interferometer of said optical objective is devoid of an optical component configured to operationally compensate for presence of the optical retarder in the first arm.

BRIEF DESCRIPTION OF THE DRAWINGS

The invention will be more fully understood by referring to the following Detailed Description in conjunction with the generally not-to-scale Drawings, of which.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Figure 1:
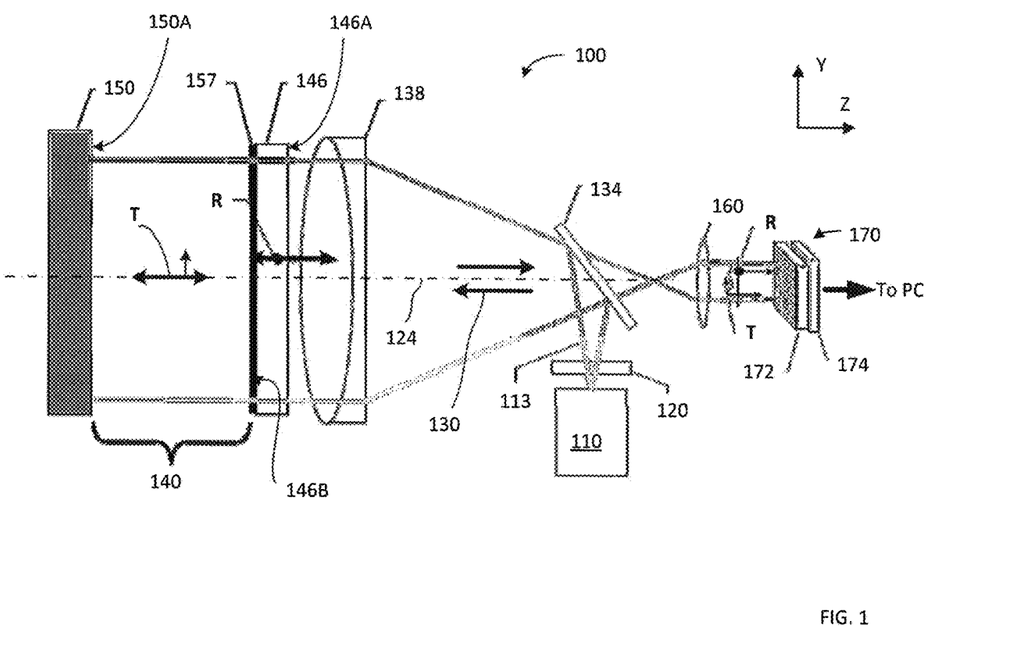
FIG. 1 is a schematic representation of the optical train of a Fizeau interferometer of related art configured for testing surfaces with the use of a polarization-based phase-shift sensor and a wire-grid thin-film applied to (affixed to, attached to) the reference surface.

Referring to FIG. 1 as an example 100 of interferometer-based embodiments employed in prior art, a laser source 110 is used to produce a diverging beam of light 113 that is polarized using an adjustable polarizer 120. The diverging beam 113 is further directed along the axis 124 (in −z direction) of the system 100 as an input beam of light 130 after being reflected by a beamsplitter 134 and, upon being collimated with a lens 138, is injected into a Fizeau optical cavity 140 that is formed by a surface 146B of the reference optic 146 and a surface 150A of a workpiece under test 150. The surfaces 146B, 150A forming the cavity of the Fizeau interferometer are facing each other, and the reference optic 146 is shown to be represented, in this example, by a plane-parallel plane so the reference surface 146B is substantially planar. The surface 146A of the reference optic 146, which is a surface external with respect to the Fizeau cavity, is typically coated with an antireflection (AR) thin-film coating. The surface 146B of the reference optic 146 is typically equipped with a thin-film polarizer 157, such as a wire-grid polarizer, that is shown to be affixed to the reference surface 146B at substantially every point of the surface so that the transmitted test beam (denoted as T) and the reflected reference beam (denoted as R) that have been formed as a result of partial reflection and partial transmission of the input beam at the surface 146B have mutually orthogonal states of polarization. The test beam T is reflected from the test surface 150A, propagated through the layer 157 and the reference optic 146 in a +z direction (that is opposite to the direction of propagation of the input beam 130) and recombined with the reference beam R. The combination of beams T and R is further focused by the lens 138, partially transmitted though the beamsplitter 134, recollimated by the second lens 160 and projected incident on an optical detection system 170 that includes, in this example, a polarization phase-shift sensor 172 and a light detector 174 (such as a CCD or CMOS image sensor). The adjustable polarizer 120 can be used to match the relative intensity between the test and reference beams T, R to achieve a high contrast signal at the output of the optical detection system.

Figure 2:
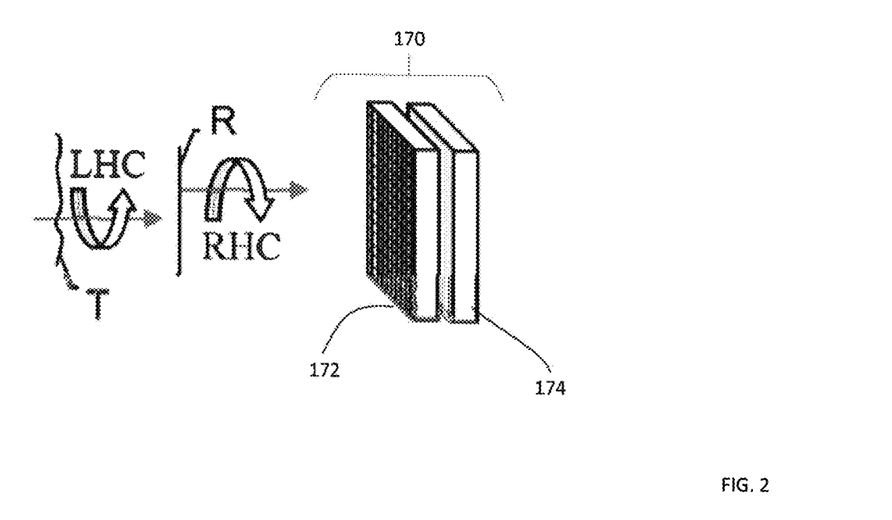
FIG. 2 are prior-art embodiments of a polarization-based phase-shift sensor.

FIG. 2 provides an example illustrating an optical component/device used in related art—in particular, the combination of the polarization phase-shift sensor 172 with the light detector 174 (discussed, in detail in U.S. Pat. No. 7,057,738, the entire disclosure of which is incorporated by reference) that shows that the overall polarization phase-shift device-based optical detection system 170 can be used for acquisition and detection of h orthogonally-polarized reference and test beams R, T, for example those possessing left-hand circular and right-hand circular polarizations (or vice versa).

Figure 3:
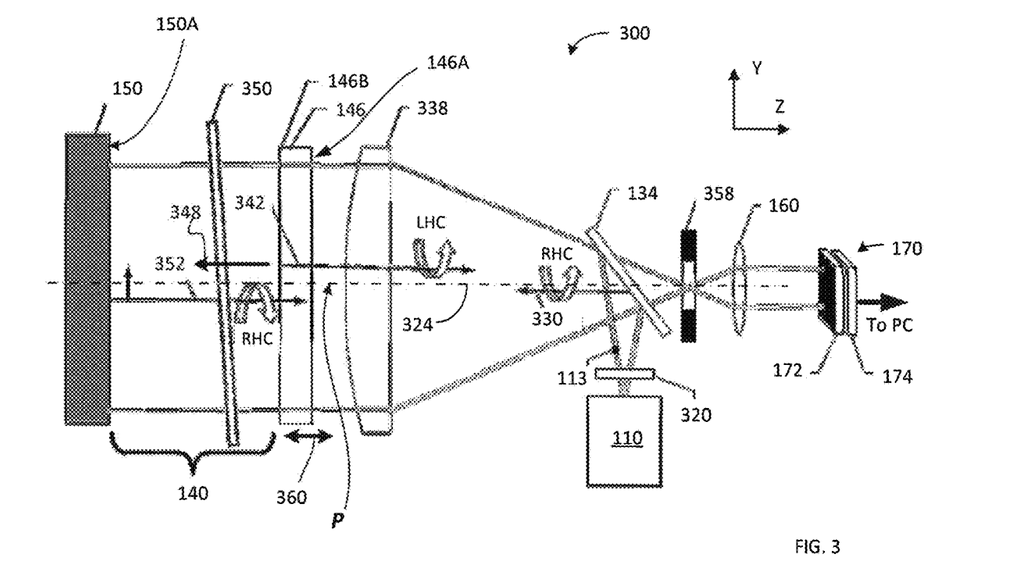
FIG. 3 shows the optical train of the present invention employing a polarization rotation pellicle and a polarization-based single-frame phase-shift sensor.

FIG. 3 shows a schematic of an embodiment 300 of the present invention that is advantageously configured in contradistinction with embodiments of related art. (In particular, as a skilled artisan will readily appreciate, the embodiment of the invention operates while not introducing a spatial tilt between the reference and test beams of light and does not include an optical polarizer affixed to the reference surface of the Fizeau cavity.) Generally, however, as shown, the optical system 300 is configured to measure the test surface 150A with the use of the input beam of light 330 (formed as a result of filtering the light output 113 of the laser source 110 with the optical polarizer 320 and re-directing the so-polarized light along the axis 324 of the system 300 in the −z direction) and the optical detection system 170. In this example, the input beam of light 330 is illustrated to have a right-hand circular polarization, and, upon being collimated with a lens 338, is partially transmitted through a reference optic 146 (in this example—a plane-parallel optical plate) towards the optical retarder 350 that is repositionably and removably disposed across the axis 324 at a distance from the reference surface 146B.

While the lens 338 in this example is shown as a plano-convex lens, it is understood that any appropriately designed lens or lens system can be used instead. During the measurement of the spatial profile of the surface of the workpiece, the reference surface 146B of the reference optic 146 and the test surface 150A of the workpiece form the Fizeau cavity 140. In practice, each of the optical surfaces present on the path of the input beam 330 towards the reference surface—in this example, the surfaces of the lens 338 as well as the front surface 146A of the reference optic 146—are coated with the AR-coating(s) to substantially produce no reflection of light from the input beam 330. The reference surface 146B reflects a portion of the input beam 330 to form the reference beam 342 that has a polarization state that is directly related to the polarization state of the input beam 330. Notably, the reflection of the input beam 330 at the reference optical surface 146A is the first reflection of the input beam upon its propagation from the beamsplitter 134 towards the reference optic 146.

In operation of the system, a portion of the input beam 330 that is transmitted through reference surface 146B to form beam 348 is further directed to traverse the distance separating an optical retarder 350 from the surface 146B and transmitted thorough the polarization rotation pellicle 350 towards the workpiece 150. In one implementation, the polarization rotation pellicle contains an optical retarder, which transforms the state of polarization of light traversing the retarder as a result of adding a phase delay to a component of such light. The parameters of the optical retarder are judiciously chosen such that at this point of propagation, upon the transmission from the pellicle 350 for the first time, the portion of the input beam 330 that has traversed the reference surface 146B has a linear polarization. The beam 348 is the reflected from the test surface 150A and redirected backwards (in the +z direction) to form the return beam 352, which is further retransmitted through the polarization rotation pellicle 350. Upon the return propagation from the workpiece 150, the state of polarization of the beam in space separating the pellicle 350 from the reference optic 146 corresponds to the right-hand circular polarization. Upon transmission through the reference surface 146B, the return beam 352 forms the test beam. The pellicle 350 is constructed such that the test beam and the reference beam 342 have mutually-orthogonal polarization states (in this example—right-hand circular and left-hand circular, respectively) at a point P between the reference optic 146 and the lens 338. (It is understood, that in related embodiment (not shown) the polarization rotation pellicle 350 can be configured to ensure that the polarization states of the test and reference beams at point P are mutually-orthogonal linear polarizations.) The reference beam 342 and the test beam are spatially recombined without any tilt, focused by the lens 338, partially transmitted though the beamsplitter 134, and re-collimated by the second lens 160 to be further projected incident on the optical detection system 170.

Notably, to avoid unwanted reflections, the polarization rotation pellicle 350 is generally oriented at a small inclination angle, typically a few degrees, with respect to the axis 324 and an aperture stop 358 is placed at the focus of the lens 338 to filter out the unwanted reflections and spurious light. A transducer/spatial repositioning device (indicated by an arrow 360) can be optionally used to translate the reference optic 146 so that a series of interferograms can be collected at the detector 174 (each corresponding to a particular spatial position of the optic 146). In this specific case, processing of optical data collected several interferograms with a programmable processor (appended to the system 170; not shown) may be used to calculate and remove any spatially-dependent polarization errors cause by the retarder 350.

In an embodiment (not shown) related to that of FIG. 3, where the spatial profile of the reflective surface 150A of the mirror 150 of the Fizeau interferometer 300 has been pre-calibrated and known, the embodiment can be appropriately used to measure the opto-geometrical characteristics of an optically-transmissive workpiece—such as a piece of optic (lens, wedge, plane-parallel plate, to name just a few)—in transmission. In this case, the workpiece in question is disposed across the optical axis 324 in one of the two spatial gaps—between the retarder 350 and the pre-calibrated surface 150A or between the reference surface 146B and the retarder 350—to have the beam 348 traverse the workpiece twice upon a round-trip of the beam 348 within the cavity 140. A person of skill in the art will readily appreciate that the irradiance distribution formed as a result of optical interference between the reference beam 324 and the test beam formed from the so-propagated beam 348 will contain information about at least the surface figure and/or optical heterogeneity of the workpiece.

Figure 4A:
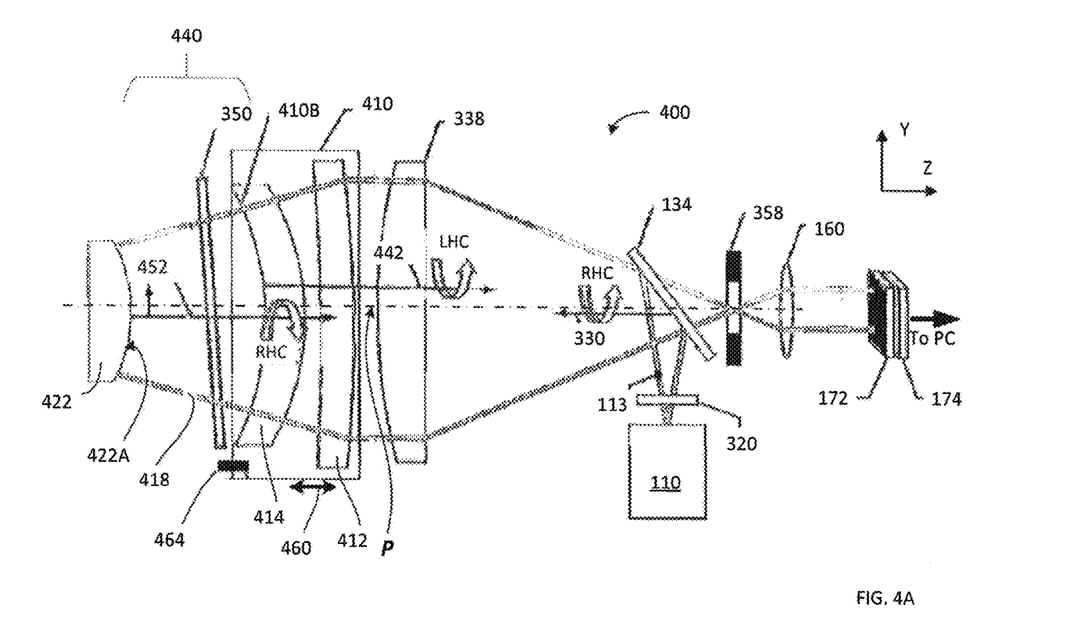
FIGS. 4A, 4B shows another embodiment of present invention using a spherical reference element and a kinematic mounting for the polarization rotation pellicle that allows calibration maps to be stored and re-used.
Figure 4B:
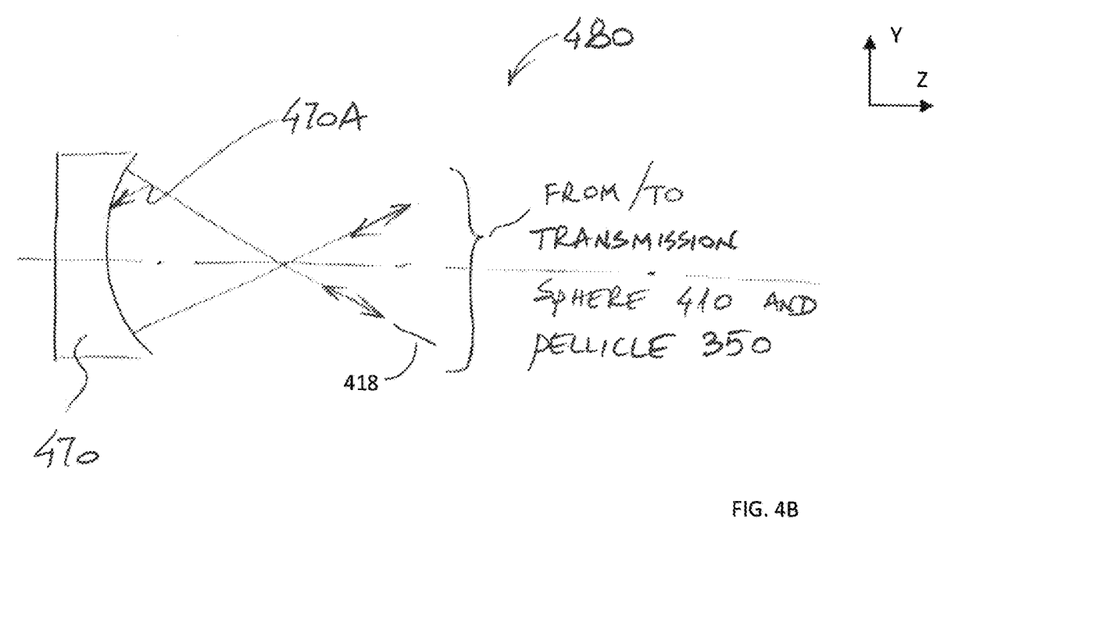

FIGS. 4A and 4B refer to examples of embodiments 400, 480 of the measurement system of the invention that utilize what is known in the art as a "transmission sphere". A so-called "transmission sphere" (also sometimes referred to as a Fizeau lens) is a set of optics used in conjunction with a laser Fizeau interferometer for the measurement of the surface form or transmitted wavefront of spherical optics and assemblies. The transmission sphere generated a spherical wavefront, while the spherical surface under test is positioned in the beam path in such a way that the spherical wavefront strikes the surface under test substantially normally and is then reflected.

In FIGS. 4A, 4B a transmission sphere outlined as 410 is shown to be formed by the combination of optical lenses 412, 414.

As illustrated in FIG. 4A, the laser source 110 produces a diverging beam of light 113 that is polarized using an adjustable polarizer 320. Upon traversing the polarizer 320, the beam 113 is reflected by the beamsplitter 134 to produce an input beam 330, which is further collimated with the lens 338 and passed on through the transmission sphere 410 to form a spatially-converging optical wavefront 418 that is incident onto the pellicle 350. When the workpiece 422 with a spatially-curved surface 422A is appropriately disposed in the path of the wavefront 418, the surface-under-test 422A and the outermost surface 410B of the transmission sphere 410 that faces the surface under test 422A form a Fizeau optical cavity 440. At the same time, the reference surface 410B reflects a portion of the input beam 330 to form the reference beam 442 that has a polarization state that is directly related to the polarization state of the input beam 330.

The portion of the input beam 330 that is transmitted through reference surface 410B is transmitted thorough the polarization rotation pellicle 350, reflected from the test surface 422A to form the return beam 452, which is further retransmitted through the polarization rotation pellicle 350 and the reference surface 410B to form the test beam. The pellicle 350 is constructed such that the co-propagating test beam and the reference beam 442 have mutually-orthogonal polarization states (in this example—right-hand circular and left-hand circular, respectively) at a point P between the transmission sphere 410 and the lens 338. It is understood, that in a related embodiment (not shown) the polarization rotation pellicle 350 can be configured to ensure that the polarization states of the test and reference beams at point P are mutually-orthogonal linear polarizations.) The reference beam 442 and the test beam are spatially recombined without mutual tilt, focused by the lens 338 towards and partially transmitted through the beamsplitter 134 and the aperture stop 358, re-collimated by the lens 160, and then propagated incident on the optical detection unit including the polarization phase-shift sensor 172 and the optical detector 174 (such as a CCD or CMOS image sensor) to form interference fringes. In one specific case, the polarization phase-shift sensor and the light detector can be integrated (in which case the optical detector substantially carries the polarization phase-shift sensor on its surface).

A transducer/spatial repositioning device (indicated by an arrow 460) can be optionally used to translate the optic 410 so that a series of interferograms can be collected at the detector 174 (each corresponding to a particular spatial position of the optic 410).

FIG. 4B illustrates a situation when the workpiece 470 having a concave surface-under-test 470A is tested with an embodiment of the invention structured similarly to that of FIG. 4A. Here, as a skilled artisan will readily appreciate, the workpiece 470 has to be positioned on the other side of the focal point of the beam 418, formed by the portion of the input beam 330 that has traversed both the transmission sphere 410 and the pellicle 350.

Figure 5:
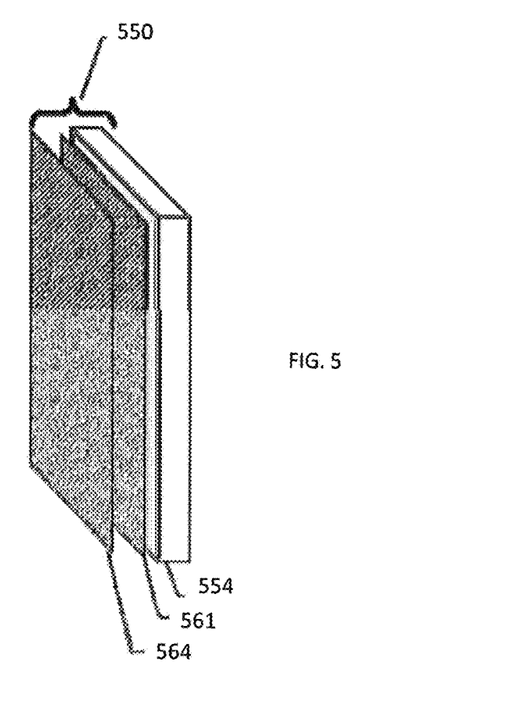
FIG. 5 shows a schematic representation of a polarization rotation pellicle, which may include a neutral substrate, a birefringent layer of material, and a linear polarizer.

In reference to any of the embodiments 300, 400, and 480, in one specific case the polarization pellicle 350 may be equipped with a housing (not shown) and a kinematic mount 464 (shown in FIG. 4A) so that the polarization rotation pellicle 350 can be calibrated and then reversibly removed from the cavity of the interferometer and subsequently reused without the need for re-calibration. To this end FIG. 5 illustrates, in exploded view, a possible configuration 550 of the polarization rotation pellicle 350, where the pellicle includes an optically-neutral substrate 554 (made of, for example, nitrocellulose) and a birefringent thin-film 561 (such as that made of a polymer-dispersed liquid crystal—see Schadt, U.S. Pat. No. 5,602,661, the disclosure of which is incorporated by reference herein). Optionally a thin film polarizer 564 can be added to the stack of materials to clean up the polarization state of light that has been reflected from the test optic and that propagates through the pellicle on the way to the optical detection system. In a specific case, the pellicle may include a thin slice (plate) of birefringent crystalline material—for example, a layer of mica of several tens of microns thick (such as about 50 microns, for example).

Figure 6:
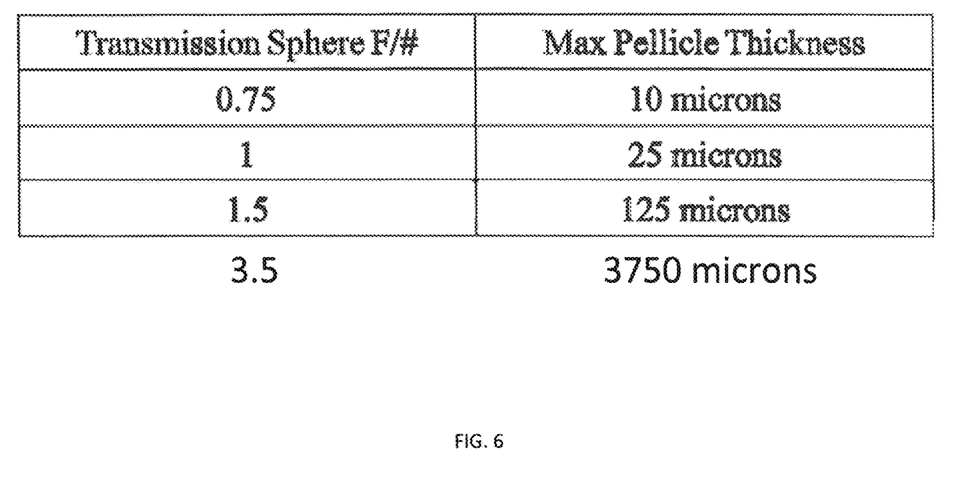
FIG. 6 shows limiting thickness values for the polarization rotation pellicle to ensure that uncalibrated wavefront errors (as a function of the transmission sphere's F-number) are less than $1/20^{th}$ of the operational wavelength.

Notably, the use of the polarization rotation pellicle 350 in the embodiments 400, 480 (where the test beam is formed from the spatially-converging portion of the input beam 330 delivered to the surface under test from the transmission sphere 410) may cause an error in the measured Fizeau cavity due to the finite thickness of the polarization rotation pellicle 350. Such error can be mitigated by making the retarder/pellicle 350 as thin as possible and as practically appropriate. FIG. 6 presents a table summarizing maximum values of the thickness of the pellicle that are practically used in an embodiment of the invention in order to achieve wavefront errors below the value of 1/20 of a wave as a function of the f-number of the transmission sphere. Commercially-available transmission spheres typically have f/0.75 or larger and, therefore the use of a pellicle with the thickness of about 10 microns in practice satisfy most of the commercial applications of the embodiments of the invention. Such unexpectedly—from the point of view of related art—thin implementation of the optical retarder 350 in an embodiment of the interferometer and during the interferometric measurement ensures the practically-advantageous extremely low optical aberrations introduced by the retarder in transmission of an optical wavefront through it. (In related embodiments, the optical thickness of the pellicle is chosen to ensure that the wavefront errors caused by the transmission of light through the pellicle are less than ¼ of a wave, more preferably less than ⅒ of a wave, and most preferably less than 1/20 of a wave.) Indeed, in contradistinction with the discussed embodiment of the optical retarder 350, the retarders used in related art have a typical thickness of about 1 millimeter (that is, at least one order of magnitude larger) often require an appropriate optical compensation in an arm of the interferometer to correct for aberrations that such retarders introduce.

A person of skill in the art will readily appreciate, therefore, that embodiment(s) of the present invention provide an optical system configured to measure a workpiece (in one case—a surface of the workpiece) in input light propagating along the axis of the system. Such optical system includes a reference optical surface positioned substantially perpendicularly to the axis. The system also includes an optical detection system including a polarization phase-shift sensor and an uncharacteristically-thin (for related art) optical retarder that is repositionably and removably disposed across the axis to be inclined with the respect to the axis and separated from the optical detector by the reference surface and from the reference surface by a first non-zero separation distance. (Such system, when configured as a Fizeau interferometer, may additionally include a device for spatially repositioning the reference optical surface along the axis to introduce temporal phase-shifts to light interacting with the reference optical surface and, when the optical retarder is removed from the optical system, to convert the Fizeau interferometer to a temporal phase-shifting Fizeau interferometer.) The optical thickness of the optical retarder component is generally on the order of or about 100 microns: preferably smaller than 500 microns, more preferably smaller than 200 microns, even more preferably smaller than 100 microns, and most preferably smaller than 50 microns (depending on specific implementation) such that no compensation—with the use of hardware and/or with the use of computational means—is required for changes introduced by such retarder to the optical wavefront propagating therethrough during practical intended interferometric measurements with the use of the disclosed optical system. Assessed from the point of view of a wavefront error, the optical thickness of the optical retarder is generally chosen such that aberrations introduced by the retarder to the optical wavefront are smaller than ¼ of a wave, preferably smaller than ⅒ of a wave, and most preferably smaller than 1/20 of a wave. (Additionally with the employment of such optical retarder, the overall optical system may be configured to be devoid of a component configured to provide operational compensation for presence of the optical retarder.)

Figure 7:
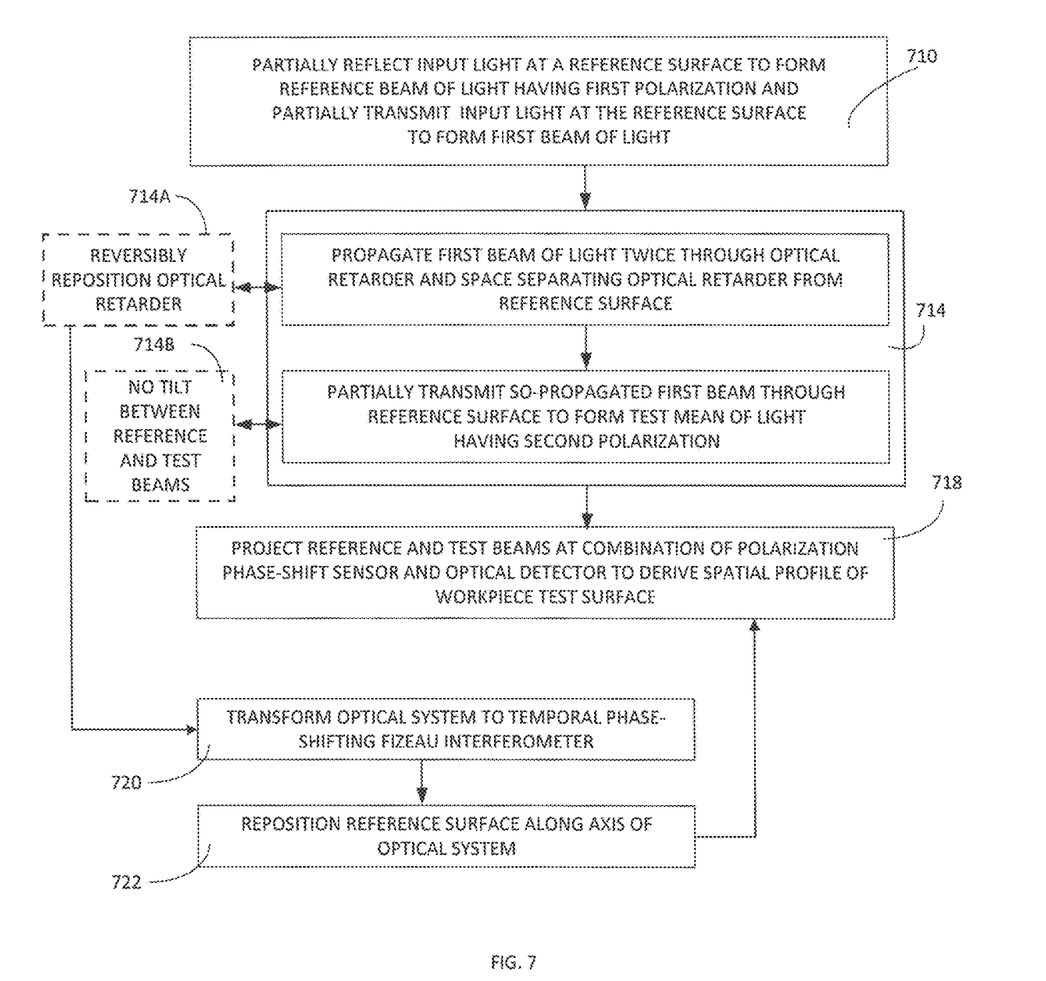
FIG. 7 is a flow-chart schematically illustrating an embodiment of a method of the invention.

A simplified flow-chart illustrating an embodiment of a method for optically testing a surface of a workpiece with an embodiment of the system of the invention is presented in FIG. 7. Here, at step 710 a reference beam of light is formed by partially reflecting the input light (generated by the chosen light source such as the laser, for example) at a surface having a known, reference spatial figure (a reference surface) and a first beam of light is formed by partially transmitting the input light through the reference surface. Light in such reference beam has a first state of polarization. The first beam, having been propagated twice through an optical retarder that is spatially separated from the reference surface, is then transmitted through the reference surface in a direction opposite to the direction from which the input light arrived, at step 714, to form a test beam with a second state of polarization. (The first and second states of polarization are generally orthogonal to one another.) In so propagating the first beam, the first beam is additionally reflected by the surface under test (the test surface), the optical retarder may be optionally repositioned and/or completely removed from the path of light (step 714A) and the reference and test beams may be formed without mutual spatial inclination (step 714B). The combination of the reference and test beams is further propagated from the reference surface to the optical detection system (equipped with a judiciously-programmed programmable processor) to derive spatial profile of the test surface, 718. Optionally, the position of the reference surface can be changed or scanned, 722, along the optical axis, during the process of collecting the data at the optical detection system to compensate for any spatially-dependent polarization errors cause by the optical retarder. In the case when the optical retarder is being removed from the path of light propagating between the test surface and the reference surface, at step 714A, the optical system is being transformed to become and operate as a conventional temporal phase-shifting Fizeau interferometer, 720.

Disclosed features of the invention, or portions of these features, may be combined in ways not listed above. Changes may be made without departing from the scope of the invention. Accordingly, in view of the numerous possible embodiments to which the principles of the disclosed invention may be applied, the invention should not be viewed as being limited to the disclosed example. For example, in the preferred embodiment the polarization rotation pellicle is placed at a small angle such that any light reflected from it is substantially blocked by an aperture stop from propagating towards the optical detection system. In one implementation, the polarization rotation pellicle containing the optical retarder is appropriately configured to produce a retardance of one-quarter of operational wavelength of light. In a related embodiment, the polarization rotation pellicle is formed to include a combination of a thin optically-neutral substrate and a thin-film-based optical retarder (such as the one using a liquid crystal polymer film, e.g. Rolic). In a related embodiment, the polarization rotation pellicle may be produced using a combination of elements including any of a thin neutral substrate, a thin-film retarder (such as the one employing a liquid crystal polymer film), and a linear polarizer to ensure that any polarization rotation occurring in the test cavity portion of the embodiment of the Fizeau interferometer of the present invention does not affect the final polarization state of the test beam. As yet another alternative, the polarization rotation pellicle may be mounted in reference to a transmission sphere of the interferometer with the use of a kinematic mount so that a residual wavefront error map is generated (from the data output produced by the optical detector) and subsequently recalled without the need for additional calibration of the system. Alternatively or in addition, in one of the embodiments the transmission optic may be mounted on an appropriate repositioning state (such as the one utilizing a transducer) to allow for multiple phase-shifted interferograms to be captured at the optical detector in order to calibrate the system for any non-ideal polarization rotations.

A skilled artisan will readily appreciate that extremely low value(s) of thickness of the embodiment(s) of the polarization rotation pellicle (in one implementation—an optical retarder) discussed above lend the idea of the invention to be implemented in a slightly different configuration, for example with an interferometric system configured as a different type of interferometer (such as a Mirau-type interferometer, or a Michelson-type interferometer, for example). Indeed, in the case of using an embodiment of the invention, even if the pellicle is inserted in the converging beam it does not create any practically-substantial thickness-dependent optical aberrations in the transmitted optical wavefront, and substantially no optical compensation of the presence of the pellicle is required.

Figure 8A:
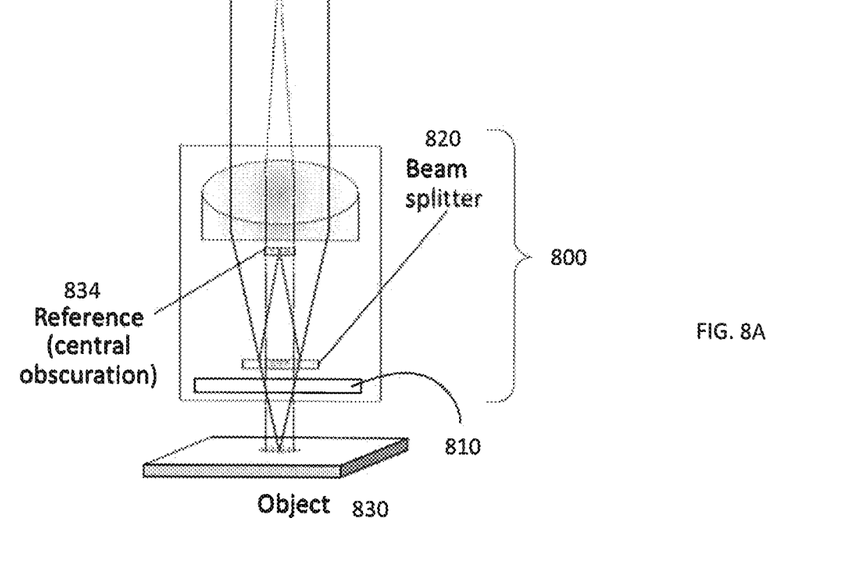
FIGS. 8A, 8B schematically illustrate embodiments of the invention configured as interferometric objectives for high- and low-magnification interference microscopy, respectively.
Figure 8B:
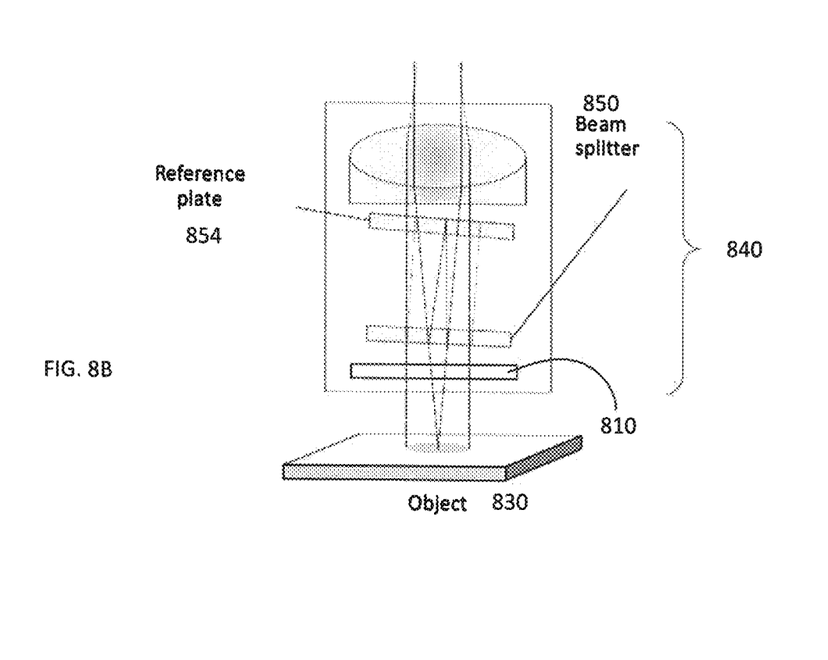

To this end, and in reference to FIG. 8A showing schematically a conventional high-magnification Mirau-type interference optical objective system 800, the objective 800 is complemented with an embodiment 810 of the pellicle (configured, for example, as the optical retarder 350) disposed between the beamsplitter 820 and the object under test 830, in only one arm of the interferometer and without any means for compensation in the other interferometric arm (defined by the beamsplitter 820 and the reference optic 834). Similarly, a related system that represents an interference low-magnification objective employing a low-magnification Michelson-type interference objective known in the art can also be equipped with the embodiment of the polarization rotation pellicle as discussed above. The pellicle in this case is installed in only one arm of the Michelson interferometer (and without any optical compensation provided for such pellicle in the other arm of the interferometer). Yet another related embodiment of the wide-field interference objective for low magnification operation, shown in FIG. 8B as 840 (described in de Groot et al., in Proc. SPIE, vol. 9525, 95250N-1 through 95250N-7, the disclosure of which is incorporated herein by reference), can be similarly modified to include the pellicle 810 in only one arm of the interferometer 844—here, as shown, between the object 830 and the beamsplitter 850. The embodiment 840 utilizes partially-transparent, parallel plates 850, 834 of optical material (with an optional tile between the plates). Notably, in each of these and related cases the pellicle can be disposed either within the housing of the objective as a stand-alone component of as a film coated on the beamsplitter portion of the objective (thereby becoming a part of the objective article of manufacture) or, as a stand-alone part, be added externally to the off-the-shelf interference objective. An interference objective containing an embodiment of the polarization rotation pellicle installed in one arm of the interferometer portion of the objective in absence of optical compensation provided in another arm of the interferometer portion falls within the scope of the present invention. Specifically, embodiments of the invention provide for an optical interference objective (whether the Mirau-type, or Michelson-type, or another type) that contains a lens, an optical beamsplitter, and a reference plate (whether that configured to operate in transmission or that configured to operate in reflection) between the lens and the beamsplitter, and that additionally contains an optical retarder (optionally inclined with respect to the optical axis of the objective) disposed in only one arm of the interferometer of the objective and spatially separated from the beamsplitter. In any implementation of such objective, the optical the optical thickness of the optical retarder is generally chosen such that aberrations introduced by the retarder to the optical wavefront are smaller than 1/4 of a wave, preferably smaller than 1/10 of a wave, and most preferably smaller than 1/20 of a wave.

Multiple related implementations of the idea of the invention can find advantageous use in various optical systems employed for optical testing of a workpiece with the use of a Fizeau interferometer (such as any of those schematically shown for example in FIGS. 6 and 7 of the Guideline No. GT-TE-2404, NASA Technical Memorandum 4322A, NASA Reliability Preferred Practices for Design and Test, NASA Office of Safety and Mission Assurance, Washington, 1999, the disclosure of which is incorporated by herein by reference). In each of these implementations, a stand-alone ultra-thin embodiment of the polarization rotation pellicle 910 is preferably disposed in a space between the surfaces forming the interferometer cavity.

Figure 9A:
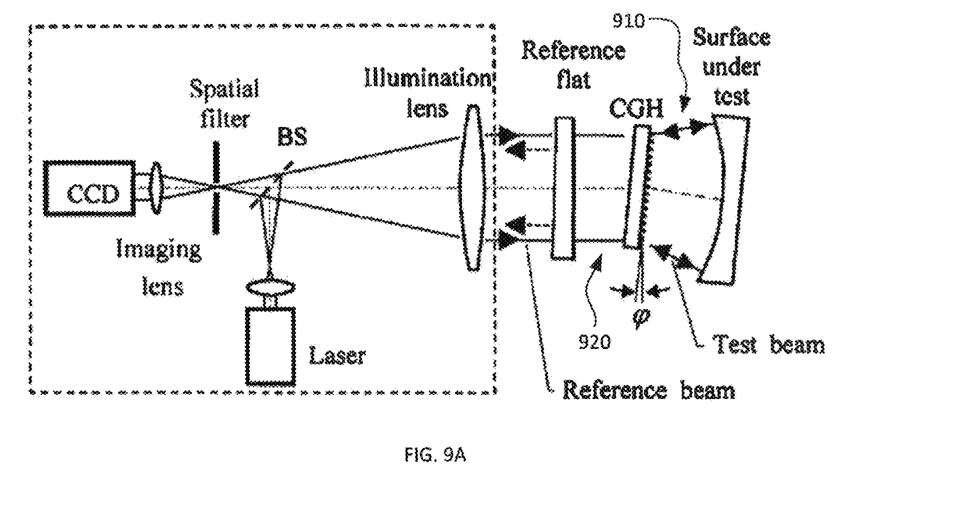
FIGS. 9A, 9B, 10 illustrate different uses of embodiments of invention configured as a Fizeau interferometer utilizing a diffractive optical element.
Figure 9B:
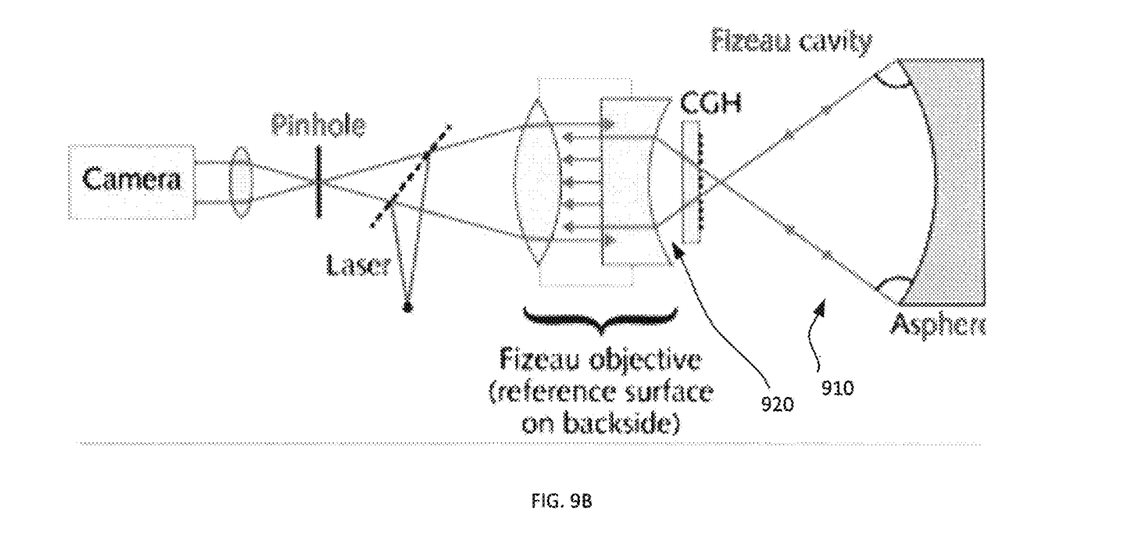

Furthermore, embodiments of the retarder of the invention may also be utilized within the cavity a Fizeau interferometer that employs a diffractive optical element (DOE; see schematics of FIGS. 9A, 9B) such as that formed by a computer generated hologram CGH (for example, an CGH configured as a null corrector for optical testing, as is known in the art). Depending on the setup, a retarder may be placed in converging or in a collimated test beam in a spatial gap between the mirrors of the interferometer (retarder not shown; see gaps 910, 920). If the so-installed retarder introduces too much of optical aberration, this know aberration could be compensated by a slight modification in CGH pattern design. In an embodiment of the interferometer containing the DOE, the reference surface may be flat or curved, or the DOE may be imprinted on the flat reference surface. For example—and in further reference to either FIG. 4A or FIG. 4B—the judiciously-configured DOE can be introduced between the spatially-curved reference surface 410B and the surface under test 422A, 470A to compensate for optical aberrations in the test wavefront caused by the retarder 350.

Figure 10:
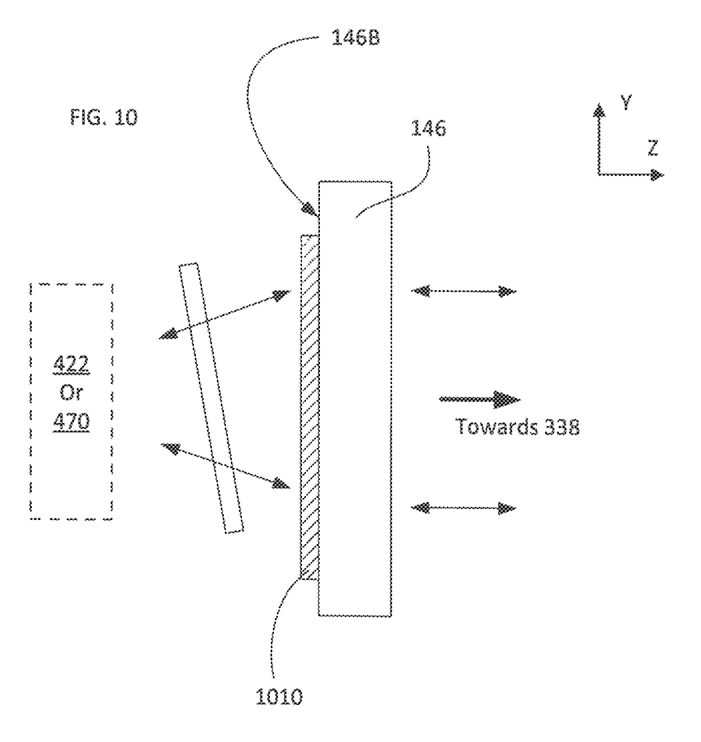

In another example, alternatively or in addition to compensating for optical aberrations caused by the presence of the pellicle 350 in the cavity of the interferometer, the DOE with which the cavity is equipped can be appropriately configured to change a degree or spatial divergence (or convergence) of an optical beam propagating through such DOE. In this case, optical testing of a spatially-curved surface of a workpiece (such as the surface 422A or 470B) can be performed with the use of the optical train of a Fizeau interferometer that is devoid of a transmission sphere (of FIG. 4A) but, instead, utilizes a transmission flat (of FIG. 3). This implementation 1000 is schematically illustrated in FIG. 10, where the DOE 1010 is configured as a transmissive refractive element with non-zero optical power and is spatially coordinated with the planar reference surface 146B. As shown, the DOE 1010 is juxtaposed with the surface 146B, although in general the DOE 1010 and the surface 146B may be spatially separated by a non-zero distance. Therefore, for the purposes of the disclosure and claiming the invention, the term diffractive optical element includes and covers a refractive optic as well.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Within this specification, embodiments have been described in a way that enables a clear and concise specification to be written, but it is intended and will be appreciated that embodiments may be variously combined or separated without parting from the scope of the invention. In particular, it will be appreciated that each of the features described herein is applicable to most if not all aspects of the invention.

In addition, when the present disclosure describes features of the invention with reference to corresponding drawings (in which like numbers represent the same or similar elements, wherever possible), the depicted structural elements are generally not to scale, for purposes of emphasis and understanding. It is to be understood that no single drawing is intended to support a complete description of all features of the invention. In other words, a given drawing is generally descriptive of only some, and not necessarily all, features of the invention. A given drawing and an associated portion of the disclosure containing a description referencing such drawing do not, generally, contain all elements of a particular view or all features that can be presented is this view, at least for purposes of simplifying the given drawing and discussion, and directing the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this particular detail in the drawing may be implied unless the context of the description requires otherwise. The described single features, structures, or characteristics of the invention may be combined in any suitable manner in one or more further embodiments.

For the purposes of this disclosure and the appended claims, the use of the terms "substantially", "approximately", "about" and similar terms in reference to a descriptor of a value, element, property, or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The invention as recited in claims appended to this disclosure is intended to be assessed in light of the disclosure as a whole, including features disclosed in related art to which reference is made.

The invention claimed is:

1. A method for optically testing a workpiece, the method comprising:
receiving input light that is polarized that propagates along an axis of an arm of an interferometer comprising a first optical surface and a second optical surface that are positioned substantially perpendicularly to the axis and that form the arm of the interferometer;
partially reflecting the input light by the first optical surface to form a reference beam;
partially transmitting the input light through the first optical surface to form a first beam of light in the arm of the interferometer that reflects from the second optical surface and is transmitted through the first optical surface to form a test beam that combines with the reference beam;
transmitting the first beam of light twice through a polarization rotation element disposed inside the arm between the first optical surface and the second optical surface across the axis to produce mutually-orthogonal polarization states between the test beam and the reference beam, wherein the polarization rotation element is distinct from the workpiece; and
receiving the combined test beam and reference beam with mutually-orthogonal polarization states by an optical detector system that includes a polarization phase-shift sensor and an optical detector that are located outside of the arm of the interferometer.

2. The method according to claim 1, wherein the polarization rotation element is reversibly repositionable within the arm of the interferometer between the first optical surface and the second optical surface, and wherein the first optical surface is a surface of an optical component that is operably cooperated with a device that is configured to spatially reposition the optical component along the axis to introduce temporal phase-shifts to light interacting with the first optical surface and, when the polarization rotation element is removed, to convert the interferometer to a temporal phase-shifting Fizeau interferometer.

3. The method according to claim 1, wherein the first optical surface is separated from the polarization rotation element by a first separation distance and the second optical surface is separated from the polarization rotation element by a second separation distance.

4. The method according to claim 1, wherein the second optical surface is a surface of the workpiece.

5. The method according to claim 1, wherein the workpiece is disposed between the first optical surface and the second optical surface.

6. The method according to claim 1, further comprising changing a degree of divergence of at least one of the reference beam and the test beam by auxiliary optical component disposed across the axis at a location between the first optical surface and the optical detector system.

7. The method according to claim 1, wherein an optical thickness of the polarization rotation element is defined such that optical aberrations introduced by the polarization rotation element to an optical wavefront, propagating therethrough during said optical testing, are smaller than one-quarter of a wave.

8. The method according to claim 1, wherein the polarization rotation element is inclined with respect to the axis.

9. The method according to claim 1, comprising incrementally repositioning the first optical surface along the axis to form a sequence of pluralities of optical interference fringes; and acquiring spatial distributions of irradiance, represented by the sequence of pluralities of optical interference fringes, with the optical detector to correct spatially-dependent errors introduced into a state of polarization of light that has traversed the polarization rotation element.

10. The method according to claim 1, wherein the test beam is formed while substantially not introducing an angular tilt between the reference beam and the test beam.

11. The method according to claim 1, wherein the first optical surface is defined to be spatially-curved.

12. An optical system having an axis and configured to measure a workpiece in input light propagating along the axis, the optical system comprising:

a first optical surface and a second optical surface positioned that are substantially perpendicularly to the axis, the first optical surface and the second optical surface forming an arm of an interferometer that receives the input light that is polarized, wherein partial reflection of the input light by the first optical surface forms a reference beam and partial transmission of the input light by the first optical surface forms a first beam that reflects from the second optical surface and is transmitted through the first optical surface to form a test beam that combines with the reference beam;

an optical detection system including a polarization phase-shift sensor and an optical detector that are located outside of the arm of the interferometer; and a polarization rotation element disposed inside the arm between the first optical surface and the second optical surface across the axis, wherein the polarization rotation element is distinct from the workpiece, and wherein the first beam propagates twice through the polarization rotation element and the polarization rotation element produces mutually-orthogonal polarization states between the test beam and the reference beam.

13. The optical system according to claim 12, wherein the first optical surface is separated from the polarization rotation element by a first separation distance and the second optical surface is separated from the polarization rotation element by a second separation distance.

14. The optical system according to claim 13, wherein the second optical surface is a surface of the workpiece.

15. The optical system according to claim 12, wherein the workpiece is disposed between the first optical surface and the second optical surface.

16. The optical system according to claim 12, wherein the polarization rotation element is reversibly repositionable within the arm of the interferometer between the first optical surface and the second optical surface, and wherein the first optical surface is a surface of an optical component that is operably cooperated with a device that is configured to spatially reposition the optical component along the axis to introduce temporal phase-shifts to light interacting with the first optical surface and, when the polarization rotation element is removed from the optical system, to convert the interferometer to a temporal phase-shifting Fizeau interferometer.

17. The optical system according to claim 12, wherein the first optical surface is defined to be spatially-curved.

18. The optical system according to claim 12, further comprising:

an auxiliary optical component disposed across the axis to change a degree of divergence of at least one of the reference beam and the test beam directed from the first optical surface towards the optical detection system, and an aperture stop disposed between the first optical surface and the optical detection system substantially in a focal plane of the auxiliary optical component.

19. The optical system according to claim 12, configured to form the test beam while substantially not introducing an angular tilt between the reference beam and the test beam.

20. The optical system according to claim 12, wherein an optical thickness of the polarization rotation element is defined such that optical aberrations introduced by the polarization rotation element to an optical wavefront, propagating therethrough during the optical testing, are smaller than one-quarter of a wave.

21. The optical system according to claim 12, wherein the polarization rotation element is inclined with respect to the axis.

22. The optical system according to claim 12, wherein:
the first optical surface is configured to be incrementally repositioned along the axis to form a sequence of pluralities of optical interference fringes; and
the optical detector is configured to acquire spatial distributions of irradiance, represented by the sequence of pluralities of optical interference fringes, to correct spatially or phase-dependent errors introduced into a state of polarization of light that has traversed the polarization rotation element.

23. The optical system according to claim 12, wherein the interferometer is a single arm interferometer with a single arm formed by the first optical surface and the second optical surface.

24. An interference optical objective containing a polarization rotation element disposed such that, when the interference optical objective is used to image an object, the polarization rotation element is inside an arm of an interferometer between a first optical surface that is partially reflective and a second optical surface that is at least partially reflective, the arm of the interferometer receives input light that is polarized, wherein the polarization rotation element is distinct from a workpiece, the polarization rotation element produces mutually-orthogonal polarization states between a test beam, which is produced from reflection from the second optical surface and propagating twice through the polarization rotation element, and a reference beam which is produced from reflection from the first optical surface.

* * * * *